United States Patent Office 3,058,948
Patented Oct. 16, 1962

3,058,948
METAL SALT-AMINE COMPLEX AND PROCESS FOR PREPARING POLYESTER RESIN COMPOSITION THEREWITH
Hans Mosimann, Breitenbach, and Walter Lutz, Busserach, Switzerland, assignors to Schweizerische Isola-Werke, Breitenbach, Switzerland, a Swiss company
No Drawing. Filed July 15, 1958, Ser. No. 748,581
Claims priority, application Switzerland July 19, 1957
21 Claims. (Cl. 260—44)

This invention relates to a process for the production of varnish resins useful in producing heat resistant protective coatings on both flat and curved surfaces, more especially metal surfaces and to articles coated with such resins.

It is known that polyvinyl formals alone or together with phenolic resins, can be used in the production of varnish resins. However, the coatings obtained by the use of these resins have insufficient heat resistance for certain purposes. This is especially the case when it is desired to apply heat resistant, electrically insulating coatings to metal surfaces, for example, metal wires.

It is also well known that polyesters made from polybasic aliphatic or aromatic carboxylic acids can be used as varnish resins. Such resins are often too brittle and they require to be modified with fatty oils, or with urea, melamine or phenolic resins, before they can be used in the manufacture of satisfactory varnish coatings.

Of particular importance among the polyesters are the esters of poly-terephthalic acid, for example the glycol ester. These esters are more suitable for the production of varnish coatings on metal surfaces, for example, metal wires. Although they are more heat resistant than, for example the polyvinyl formals, they, nevertheless, have certain disadvantages. One disadvantage arises in their manufacture. The reaction between the difficultly soluble terephthalic acid and polyhydric alcohols is ordinarily carried out in the presence of catalysts, which may be metal oxides such as lead or zinc oxides; in this reaction the temperatures required are so high that intermediate products, such as the glycol ester of terephthalic acid, sublime out of the reaction mixture and condense on to parts of the apparatus employed, so that blocking of the apparatus can result. Moreover, the esters of poly-terephthalic acid do not spread well on curved surfaces, such as those of metal wires, with the result that the baked coatings produced therewith are of variable thickness. This variation in thickness is particularly objectionable in the case of varnished wire, where the coating, although thin, must nevertheless have good electric insulating properties and good mechanical strength. This variation in thickness of the varnish coating is caused by an unduly slow setting of the varnish on the metal surface. The varnish runs at the high baking temperatures usually used (for example, 300° C. in the making of varnished wire).

The present invention enables new kinds of varnish resins to be made, without encountering the above noted difficulties in production, with which heat resistant and uniform coatings can be applied, not only to flat surfaces but also to curved surfaces, and more especially to metal wires.

It has now been found that extremely useful polyester varnish resins can be made by carrying out the polycondensation of the carboxylic acid component with the alcohol component in the presence of catalysts which are hereinafter described. Particularly interesting varnish resins result when this polycondensation is carried out in the presence of certain resins which contain groups which are able to react with the amine component of these catalysts.

In accordance with the present invention there is provided a process for the production of a varnish resin which comprises heating a polyhydric alcohol or ether alcohol with an aromatic carboxylic acid having at least two carboxyl groups or with the anhydride or with a monohydric alcohol ester thereof in the presence of a catalyst which is soluble in the reaction mixture and which consists of a normally stable complex formed between (a) a salt of a metal which is at least divalent and an organic compound containing a hydroxyl group and (b) two mols of a primary monoamine or one mol of a polyamine containing at least two primary amino groups, the reaction mixture being heated to a temperature at which the said complex in solution is gradually decomposed.

The carboxylic acid materials employed are aromatic polycarboxylic acids which can be converted to polycondensation products by reaction with polyhydric alcohols; they may also be functional derivatives of such acids, for example, their esters or anhydrides. There may be used bibasic, aromatic monocyclic or polycyclic carboxylic acids, for example, phthalic, iso-phthalic, terephthalic and naphthalic acids. Terephthalic acid yields polyester resins which are particularly well suited for the manufacture of varnish-coated wires.

The polyhydric alcohols may be di- or polyhydric aliphatic alcohols. Especially preferred are the glycols, such as ethylene glycol and the polyethylene glycols, such as diethylene glycol, as well as the tri- and polyhydric alcohols, such as glycerol, hexantriol and pentaerythritol. There may also be used mixtures of such alcohols in order to improve the film-forming properties of the resulting resins: for example, mixtures of glycols with glycerol, which are particularly suitable for the production of the esters of poly-terephthalic acid.

The catalyst employed in the process of the present invention is a complex metal-amine compound which exerts a catalytic influence on the polycondensation and, in certain cases, also functions as a hardener. One type of compound which can be used is represented by the following general formula:

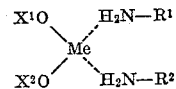

in which Me is zinc, cadmium, magnesium, calcium, copper, lead, tin, chromium, manganese, iron, cobalt or nickel, $X^1$ and $X^2$ are monovalent aryl or acyl groups or together represent a divalent arylene group and $R^1$ and $R^2$ are aliphatic, cycloaliphatic or aromatic hydrocarbon groups.

Another type of compound which may be used, especially when the polycondensation is to be carried out in the presence of condensation products which are able to react with the amine component of the metal-amine compound as it is liberated, is represented by the following general formula:

in which $X^1$, $X^2$ and Me are as defined above, and R is an alkylene radical which may be interrupted by at least one —NH group.

In the preceding general formulae, the groups $X^1$ and $X^2$ may be acyl groups having one to nine carbon atoms, such as acetyl, propionyl, butyryl or ethyl-hexyl; or monocyclic or polycylic aryl groups such as phenyl or naphthyl. The aryl groups may contain one or more nuclear substituents such as alkyl and/or hydroxyl groups. In addition, $X^1$ and $X^2$ may together constitute a divalent arylene group such as the ortho-phenylene group, and this may also have one or more nuclear substituents such as alkyl and/or hydroxyl groups. The divalent group R in the second general formula may, for example, be a low alkylene group, particularly an ethylene, n-propylene or an n-butylene group and may be a divalent group having the general formula:

$$-(R^3-NH)_n-R^4-$$

in which $R^3$ and $R^4$ may be either like or unlike straight or branched chain alkylene groups, and $n$ is an integer from 1 to 4. Thus $R^3$ and $R^4$ may be ethylene, n-propylene or iso-propylene groups.

The complex metal-amine compounds indicated by the above general formulae may be obtained by allowing an oxide of the metal, which is to form the central atom of the complex, to react with an organic carboxylic acid, the resulting salt then being treated with a mono- or poly-amine. In selecting the initial compounds, that is to say, the organic carboxylic acids and the amines, it must be remembered that the metal-amine compound which is used according to the invention for the catalysis of the polycondensation between the polybasic organic carboxylic acid and the polyhydric alcohol, must be soluble in the polycondensation reaction mixture, and must decompose gradually, at moderately high temperatures, and release the metal ions which act as catalysts in the formation of the ester. It must also be remembered that the decomposition products must not have a detrimental action on the finished varnish resin.

Alternatively, the metal oxides may be reacted with phenols to form the corresponding phenolates. There may be used monocyclic or polycyclic monohydric phenols such as phenol, the cresols, the xylenols, the naphthols or mixtures of these compounds; or there may be used polyhydric phenols such as the dihydroxybenzenes (hydroquinone, pyrocatechol or resorcinol) or the trihydroxybenzenes, such as pyrogallol, oxyhydroquinone or phloroglucinol. Moreover, the metal oxides may be reacted with organic carboxylic acids, provided that the products are soluble in the polycondensation reaction mixture.

The organic carboxylic acid may be an aliphatic, monobasic carboxylic acid, more especially a liquid fatty acid having 1 to 9 carbon atoms, such as acetic, propionic, butyric or ethyl hexoic acid. In the synthesis of the metal-amine complexes, it is preferred to use liquid materials in which the metal oxides dissolve with the formation of salts, thus making it unnecessary to provide additional solvents.

The phenolates and cresolates of the above metals are particularly useful, since these salts are readily soluble in an excess of the phenols or cresols employed for their synthesis. The excess phenol or cresol also serves as a solvent or diluent, for the resulting varnish resin. These phenolates and cresolates are very easily obtained by dissolving, for example, zinc, copper, lead or cadmium oxides in phenol or cresol.

The resulting salt of a metal with a phenol or a carboxylic acid may then be reacted with the selected amine. The amine used may be a primary aliphatic, cyclo-aliphatic or aromatic monoamine. Examples of such monoamines are propylamine, butylamine, pentylamine, aniline and cyclo-hexylamine. Preferably aliphatic primary monoamines are used. When a monoamine is used, compounds having the first general formula given above are obtained. When a compound having the second general formula is required, then a di- or polyamine, having terminal primary amino groups, is used: this may be an aliphatic, cyclo-aliphatic or aromatic diamine or polyamine. Especially useful are the aliphatic di- and poly-amines, such as ethylene diamine, propylene diamine, butylene diamine, diethylene triamine, triethylene tetramine and tetraethylene pentamine. Polyalkylene polyamines which contain, as their alkylene group, an ethylene, n-propylene or iso-propylene group may be used. The preferred polyamines may be represented by the general formula:

$$NH_2-(R^3-NH)_n-R^4-NH_2$$

in which $R^3$ and $R^4$ are like or unlike straight or branched chain alkylene groups and $n$ is an integer from 0 to 4.

The formation of the metal-amine complex by reaction of the metal salt, for example the metal phenolate or cresolate, with the amine may be carried out by adding the mono- or poly-amine slowly, and with stirring, to the metal salt, either in the presence or in the absence of a solvent; and, if necessary, by gently heating the reaction mixture. When a monoamine is used, two mols are required per mol of metal salt for forming the complex, or when a polyamine is used, only one mol is needed per mol of metal salt.

The preferred complex metal-amine compounds, for use as catalysts in the polycondensation of terephthalic acid with polyhydric alcohols, are the complexes of zinc, lead and copper phenolates and cresolates with ethylene diamine.

The complex metal-amine compounds having the second general formula have the important advantage that the are gradually decomposed during the course of the polycondensation of the poly-basic carboxylic acid with the polyhydric alcohol, and at the moderately high temperatures employed, releasing metal ions which accelerate the reaction and simultaneously form the free diamine. The diamine thus liberated can then react with the polycondensation product as it is being formed, with the apparent result that compounds of a polyamine type are formed which later, in the course of the subsequent baking process, react with the polycondensation product by formation of cross-linkages, into an infusible and insoluble substance.

The catalysts having the above general formulae are especially advantageous for the polycondensation of terephthalic acid with polyhydric alcohols, particularly with glycol and glycerol. These catalysts have high activity even at moderately elevated temperatures, and thus it becomes possible to conduct the esterification of the terephthalic acid with glycol and glycerol, as well as the condensation of the resulting monomeric ester, at temperatures far lower than those which prevail in the processes heretofore used; with the result that sublimation of the glycol terephthalate and the consequent disturbance of production arising from obstruction of pipes and jamming of stirrers is obviated.

The effectiveness of these catalysts is shown by the fact that the terephthalic acid, which on account of its low solubility does not ordinarily react without the use of increased pressure, can now be directly esterified in a short time under normal pressure. Thus the usual detour involving ester interchange is rendered unnecessary. Similarly pure glycol terephthalate can also be condensed in this way.

Particularly valuable varnish resins can be obtained if at least the latter part of the polycondensation of the polybasic carboxylic acid with the polyhydric alcohols is conducted in the presence of a resin having the ability to react with the amine liberated during the course of the polycondensation reaction, so that it is converted by polycondensation or cross-linking, to an infusible and insoluble state.

Examples of such resins are the soluble and fusible phenolic resins and the epoxy resins. In particular, in the production of polyesters from terephthalic acid and the polyhydric alcohols, such as glycol and glycerol, the use of such a resin, which reacts with the amine component of the metal-amine complex, makes it possible to produce varnish resins which, when baked at high temperatures on metal surfaces, for example on metal wires, yield uniform, smooth, tough, abrasion resistant, heat resistant and solvent resistant films, which have outstanding electrical insulating properties.

In contrast thereto, if the polycondensation is carried out in the presence of a phenolic or epoxy resin, but without addition of one of the above-described complex metal-amine compounds, then the product is merely a mixture of thermoplastic resins, soluble in many solvents, but useless for the production of heat and solvent resistant varnish coatings.

The added resin, for example an epoxy or a phenolic resin, may be first partially condensed with the complex metal-amine compound, and the resulting product introduced into the polycondensation reaction mixture at the beginning, or towards the end, of the reaction.

If the added resin is an epoxy resin, then it may be partially reacted with an acid hardening agent, and then added to the poly-condensation mixture in the presence of the metal-amine complex, or its amine component, with which it is allowed to condense further.

It has not hitherto been known that complex metal-amine compounds of the above kind can be used in such a way that, on their decomposition at moderately high temperatures, the released metal ions accelerate the polycondensation reaction while at the same time the amine component liberated by the decomposition can promote cross-linking with epoxy resins or the further condensation with phenolic resins.

The fact that the decomposition of the metal-amine complex proceeds quite gradually makes it possible to conduct the cross-linking with the epoxy resin, even at higher temperatures, without insoluble products being immediately formed whereas, free polyamines themselves normally cause cross-linking of epoxy resins even in the cold, and at higher temperatures rapidly convert them into insoluble products. It thus becomes possible to control the cross-linking with the added epoxy resin in such a way that it is only after the application of the varnish resin to the surface to be protected, and upon application of heat, that the reaction is brought to its completion.

The varnish resins obtained by the process of the presentn invention may be applied to the surfaces to be coated, either directly or after thinning with appropriate solvents or thinners, and then baked, to produce heat resistant and solvent resistant films. Those obtained from terephthalic acid, or its functional derivatives, and polyhydric alcohols, particularly glycol or glycerol or mixtures thereof, are particularly suitable for varnishing wires for electrical purposes. Wires coated with films of varnish made from the resins produced in accordance with this invention have a higher heat resistance than the widely used wires coated with polyvinyl formal varnishes. While the latter wires belong to class E (120° C.), the wires coated with resins made according to the present invention belong to class B (130° C.) or class F (155° C.). One of the most important advantages of the new varnish resins of this invention is the fact that they spread well on curved surfaces, for example on metal wires, to yield uniform films of varnish.

The following examples illustrate the invention.

*Example I*

To a mixture of 223 g. of lead oxide in 500 g. of cresol is added, gradually and with gentle heating and stirring, 103 g. of diethylene triamine. When the reaction is complete, heating is continued for a further 3 hours in an atmosphere of carbon dioxide under reflux and at 130° C. The resulting solution is used as a catalyst.

291 g. of the dimethyl ester of terephthalic acid, 62 g. of glycol and 45 g. of glycerol are mixed with 0.8 g. of the catalyst solution. Even with this small quantity of catalyst the reaction starts spontaneously at 100° C.

The methanol is continuously removed by distillation. In this process the temperature must be gradually increased, but the resulting glycol terephthalate does not form as a sublimate covering the whole of the inside of the apparatus. The ester conversion is complete when the temperature reaches 220° C. The mixture is then put under vacuum and the vessel heated to a temperature of 250° C. The resulting varnish resin can be immediately diluted with 350 g. of cresol. This varnish, after filtration and standardisation, can be coated on to copper wire and baked, in the usual way.

*Example II*

250 g. of copper sulphate and 75 g. of an 80% ethylene diamine are reacted in 500 g. of cresol as in Example I, the water being driven off in the heating. The product is the corresponding copper amine complex.

249 g. of terephthalic acid are mixed with 270 g. of ethylene glycol, 180 g. of glycerol and 7.5 g of the solution of the copper amine complex. The reaction begins at 110–120° C. and the temperature is increased as in Example I, to 220° C. the excess of alcohol being removed by distillation. After that, heating is continued under vacuum to a vessel temperature of 260° C. Dilution with cresol yields a varnish which, after filtering and standardisation, can be used for coating on a wire.

*Example III*

81 g. of zinc oxide are allowed to react slowly with 189 g. of tetraethylene pentamine in 500 g. of o-cresol, the reaction being completed by heating at 130° C. for three hours in an atmosphere of carbon dioxide.

To a mixture of 291 g. of the dimethyl ester of therephthalic acid, 270 g. of ethylene glycol and 180 g. of glycerol is added 1 g. of the above catalytic zinc-amine solution, and the reaction proceeded with as described in Example I.

*Example IV*

17 g. of an epoxy resin with an epoxy equivalent weight of 250 are well mixed with 15 g. of the solution of the lead-amine complex described in Example I. The mixture is then heated to 100° C., whereupon the temperature is found to continue rising as the result of a spontaneous reaction. When the temperature reaches about 140° C., the reaction is interrupted by the rapid addition of a previously prepared mixture of 291 g. of the dimethyl ester of terephthalic acid, 62 g. of anhydrous glycol and 45 g. of anhydrous glycerol. The reaction mixture is then warmed with vigorous stirring; the ester conversion beginning at about 100° C. Methanol is continuously removed by distillation, while the temperature of the mixture is gradually increased. The ester conversion is complete when the temperature of the vessel has risen to about 220° C. The mixture is then put under vacuum till the vessel temperature reaches 250° C. The resulting varnish resin is immediately diluted with 350 g. of cresol, yielding a varnish that, after filtration and standardisation, can be applied to a wire and baked, in the usual way.

*Example V*

17 g. of an epoxy resin with an epoxy equivalent weight of 250 is mixed with 25 g. of the lead-amine complex solution described in Example I, and heated to 100° C. When the heat of reaction has brought the temperature up to 150° C., the product is thinned by the addition of a cold solution containing 18 g. of the same epoxy resin, in cresol. This brings the reaction to a stop.

Furthermore, to 1.2 g. of the solution of the complex described in Example I, is added a mixture of 291 g. of the dimethyl ester of terephthalic acid, 62 g. of glycol and 45 g. of glycerol. The reaction is conducted in the manner described in Example I. Towards the end of the condensation, the epoxy solution is added to hot condensate. Immediate dilution of the reaction product yields a varnish which, after filtration, can be coated on a wire and baked.

*Example VI*

35 g. of an epoxy resin with an epoxy equivalent weight of 340 is heated with 40 g. of phthalic anhydride till the reaction starts, as shown by the evolution of heat. The reaction mixture is then chilled with the alcohols required for the production of the polycondensation product.

For the production of the polycondensation product, 365 g. of dimethyl terephthalate, 62 g. of ethylene glycol and 45 g. of glycerol are used. To this mixture is added 1.5 g. of the catalyst solution described in Example II. The reaction is conducted as described in Example IV.

After dilution of the reaction product with cresol, the resulting varnish is filtered and yields a product that can be baked on a wire to give a smooth film.

We claim:

1. A process for the production of a varnish resin which comprises heating an alcohol having at least two but less than four alcoholic hydroxyl groups with an aromatic dicarboxylic acid compound in the presence of a catalyst which is soluble in the reaction mixture and which consists of a normally stable complex formed from (*a*) a salt of a metal selected from the group consisting of zinc, cadmium, magnesium, calcium, copper, lead, tin, chromium, manganese, iron, cobalt and nickel and an organic compound containing a hydroxyl group and (*b*) a di-primary amine, said mixture being heated to a temperature at which said complex gradually decomposes.

2. A process for the production of a varnish resin which comprises heating an alcohol having at least two but less than four alcoholic hydroxyl groups with an aromatic dicarboxylic acid compound in the presence of a catalyst which is soluble in the reaction mixture and which consists of a normally stable complex having the general formula

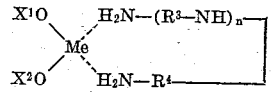

in which Me is a metal selected from the group consisting of zinc, cadmium, magnesium, calcium, copper, lead, tin, chromium, manganese, iron, cobalt and nickel, $X^1$ and $X^2$ are both aryl groups and $R^3$ and $R^4$ are lower alkylene groups and $n$ is an integer from 0 to 4.

3. A process for the production of a varnish resin which comprises heating an alcohol having at least 2 but less than 4 alcoholic hydroxyl groups with an aromatic dicarboxylic acid compound in the presence of a catalyst which is soluble in the reaction mixture and which consists of a normally stable complex having the general formula:

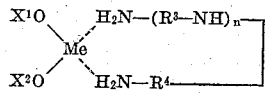

in which Me is a metal selected from the group consisting of zinc, cadmium, magnesium, calcium, copper, lead, tin, chromium, manganese, iron, cobalt and nickel, $X^1$ and $X^2$ are both aliphatic acyl groups, $R^3$ and $R^4$ are lower alkylene groups and $n$ is an integer from 0 to 4.

4. A process for the production of a varnish resin which comprises heating an alcohol having at least two but less than four alcoholic hydroxyl groups with an aromatic dicarboxylic acid compound in the presence of a catalyst having the general formula:

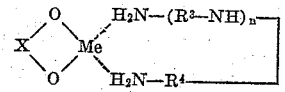

in which Me is a metal selected from the group consisting of zinc, cadmium, magnesium, calcium, copper, lead, tin, chromium, manganese, iron, cobalt and nickel, X is an arylene group, $R^3$ and $R^4$ are lower alkylene groups and $n$ is an integer from 0 to 4.

5. A process according to claim 2, in which at least the latter part of the reaction is carried out in the presence of a resinous condensation product which is soluble in the reaction mixture and which reacts with the amine liberated by the gradual decomposition of the catalyst complex.

6. A process according to claim 5, in which the condensation product is a soluble and fusible phenolic resin.

7. A process according to claim 5, in which the condensation product is an epoxy resin.

8. A process according to claim 7 in which the epoxy resin has been partially precured with an acid hardening agent.

9. A process according to claim 3, in which at least the latter part of the reaction is carried out in the presence of a resinous condensation product which is soluble in the reaction mixture and which reacts with the amine liberated by the gradual decomposition of the catalyst complex.

10. A process according to claim 9, in which the condensation product is a soluble and fusible phenolic resin.

11. A process according to claim 9, in which the condensation product is an epoxy resin.

12. A process according to claim 11, in which the epoxy resin has been partially precured with an acid hardening agent.

13. A process according to claim 4 in which at least the latter part of the reaction is carried out in the presence of a resinous condensation product which is soluble in the reaction mixture and which reacts with the amine liberated by the gradual decomposition of the catalyst complex.

14. A process according to claim 13, in which the condensation product is a soluble and fusible phenolic resin.

15. A process according to claim 13, in which the condensation product is an epoxy resin.

16. A process according to claim 15, in which the epoxy resin has been partially precured with an acid hardening agent.

17. A metal complex of the formula

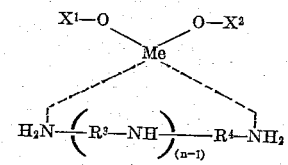

wherein $X^1$ and $X^2$ are monovalent aryl groups; $R^3$ is a lower alkylene group; $R^4$ is a lower alkylene group; $n$ is an integer from 1 to 5; Me is a member selected from the group consisting of zinc, cadmium, magnesium, calcium, copper, lead, tin, chromium, manganese, iron, cobalt and nickel.

18. A metal complex of the formula

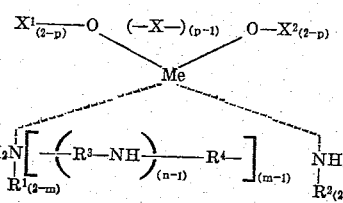

wherein $X^1$ and $X^2$ are each a single member selected from the group consisting of aliphatic acyl and aryl; X is divalent arylene; $R^1$ and $R^2$ are members selected from the group consisting of aliphatic, cycloaliphatic and aromatic hydrocarbon groups; $R^3$ is a lower alkylene group; $R^4$ is a lower alkylene group; $n$ is an integer from 1 to 5; $m$ is an integer from 1 to 2; $p$ is an integer from 1 to 2;

and Me is a metal selected from the group consisting of zinc, cadmium, magnesium, calcium, copper, lead, tin, chromium, manganese, iron, cobalt and nickel.

19. Lead salt of cresol complex with diethylene triamine.

20. Copper salt of cresol complex with ethylene diamine.

21. Zinc salt of o-cresol complex with tetraethylene pentamine.

References Cited in the file of this patent

UNITED STATES PATENTS

| 2,808,390 | Caldwell | Oct. 1, 1957 |
| 2,859,199 | Parker | Nov. 4, 1958 |
| 2,878,236 | Young et al. | Mar. 17, 1959 |

FOREIGN PATENTS

| 590,451 | Great Britain | July 17, 1947 |